United States Patent
Yasuda et al.

(10) Patent No.: US 7,600,821 B2
(45) Date of Patent: Oct. 13, 2009

(54) SEAT

(75) Inventors: Eiichi Yasuda, Aichi-gun (JP); Shunichi Doi, Aichi-gun (JP); Kazukata Takei, Aichi-gun (JP); Etsunori Fujita, Hiroshima (JP); Yumi Ogura, Hiroshima (JP); Seiji Kawasaki, Hiroshima (JP)

(73) Assignee: Delta Tooling Co., Ltd., Hiroshima-shi (JP)

( * ) Notice: Subject to any disclaimer, the term of this patent is extended or adjusted under 35 U.S.C. 154(b) by 496 days.

(21) Appl. No.: 10/187,990

(22) Filed: Jul. 3, 2002

(65) Prior Publication Data

US 2003/0006640 A1 Jan. 9, 2003

(30) Foreign Application Priority Data

Jul. 4, 2001 (JP) ............................. 2001-204091
Jun. 28, 2002 (JP) ............................. 2002-190178

(51) Int. Cl.
A47C 7/02 (2006.01)
(52) U.S. Cl. ............................. 297/452.29; 297/452.56
(58) Field of Classification Search ............ 297/452.56, 297/452.29
See application file for complete search history.

(56) References Cited

U.S. PATENT DOCUMENTS

| | | | | | |
|---|---|---|---|---|---|
| 4,883,320 | A | * | 11/1989 | Izumida et al. | 297/452.56 |
| 5,013,089 | A | * | 5/1991 | Abu-Isa et al. | 297/452.64 |
| 5,393,126 | A | * | 2/1995 | Boulva | 297/452.56 |
| 5,775,779 | A | * | 7/1998 | Abu-Isa et al. | 297/452.56 |
| 6,264,279 | B1 | * | 7/2001 | Chow | 297/452.56 |
| 6,302,487 | B1 | * | 10/2001 | Fujita et al. | 297/452.56 |
| 6,478,381 | B1 | * | 11/2002 | Cramb et al. | 297/452.13 |
| 6,485,103 | B1 | * | 11/2002 | Yamada et al. | 297/452.56 |
| 2002/0033630 | A1 | * | 3/2002 | Takata | 297/452.56 |
| 2002/0060493 | A1 | * | 5/2002 | Nishino et al. | 297/452.56 |
| 2002/0096932 | A1 | * | 7/2002 | Fujita et al. | 297/452.56 |
| 2002/0135218 | A1 | * | 9/2002 | Fujita et al. | 297/452.56 |
| 2003/0201659 | A1 | | 10/2003 | Yasuda et al. | |

FOREIGN PATENT DOCUMENTS

| | | |
|---|---|---|
| JP | 60-2531 | 1/1985 |
| JP | 02-074648 | 3/1990 |
| JP | 6-15551 | 3/1994 |
| JP | 7-47022 | 2/1995 |
| JP | 7-327773 | 12/1995 |
| WO | WO99/20159 | 4/1999 |

* cited by examiner

Primary Examiner—Sarah B McPartlin
(74) Attorney, Agent, or Firm—Oblon, Spivak, McClelland, Maier & Neustadt, L.L.P.

(57) ABSTRACT

A seat provides a band-like support for the body sides of a user so as to reduce the supporting pressure on the user's lumbar and to hold the user's upper body stably. In this seat, the center of a load to be received in regions symmetrically divided to a vertical central line of the seat are positioned outside of a back region defined by left and right angulus inferior scapulae and by the upper ends of iliac bones. Moreover, the load ratios in the individual regions are not more than 25% in the region corresponding to a region extended downward from the back region.

25 Claims, 10 Drawing Sheets

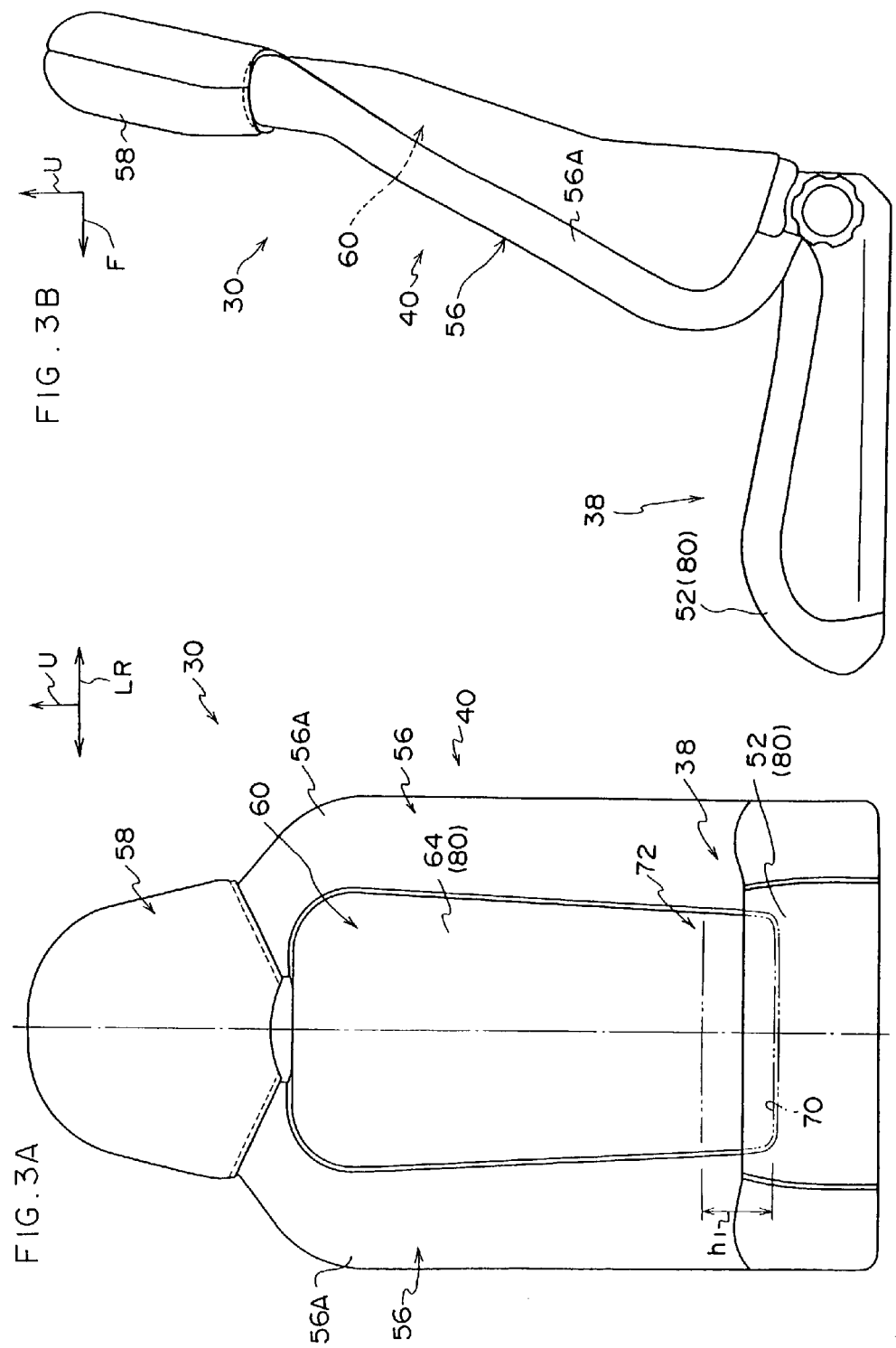

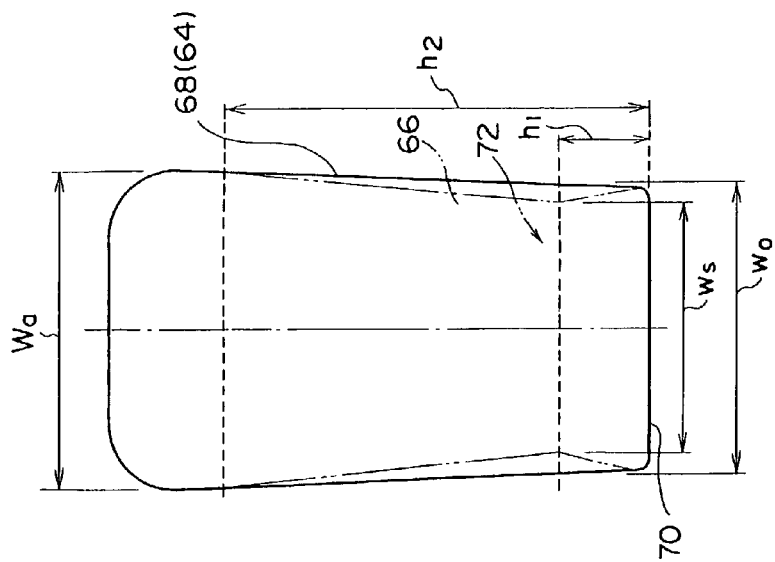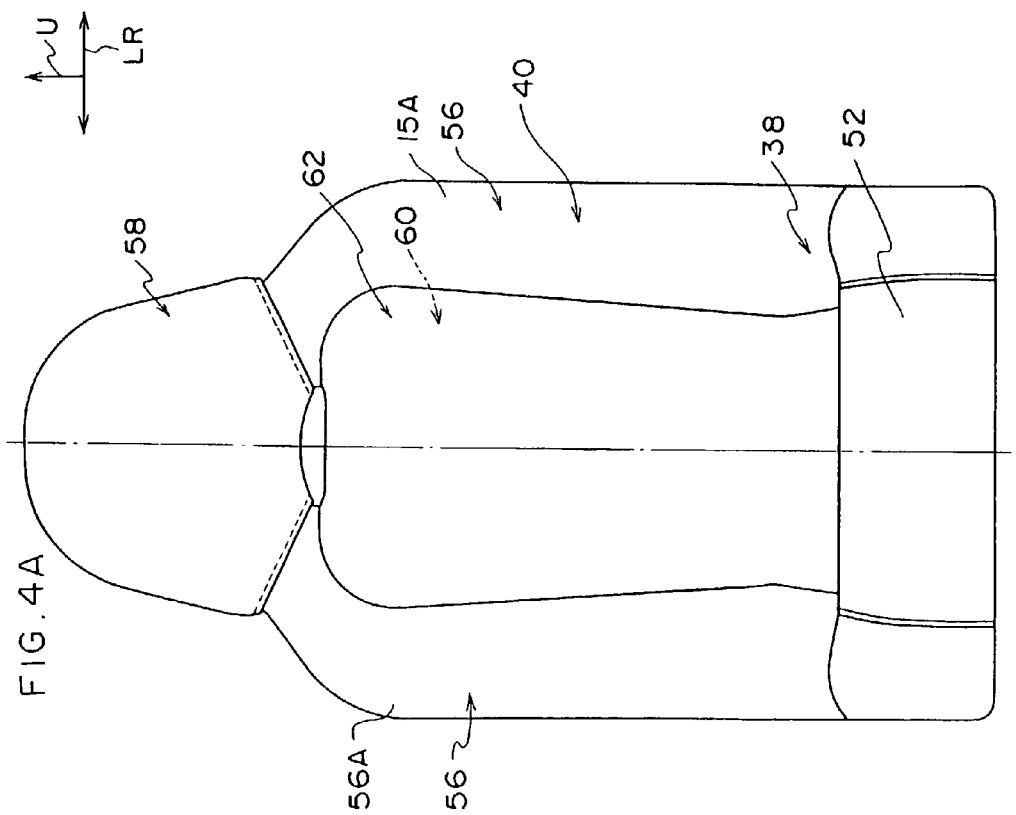

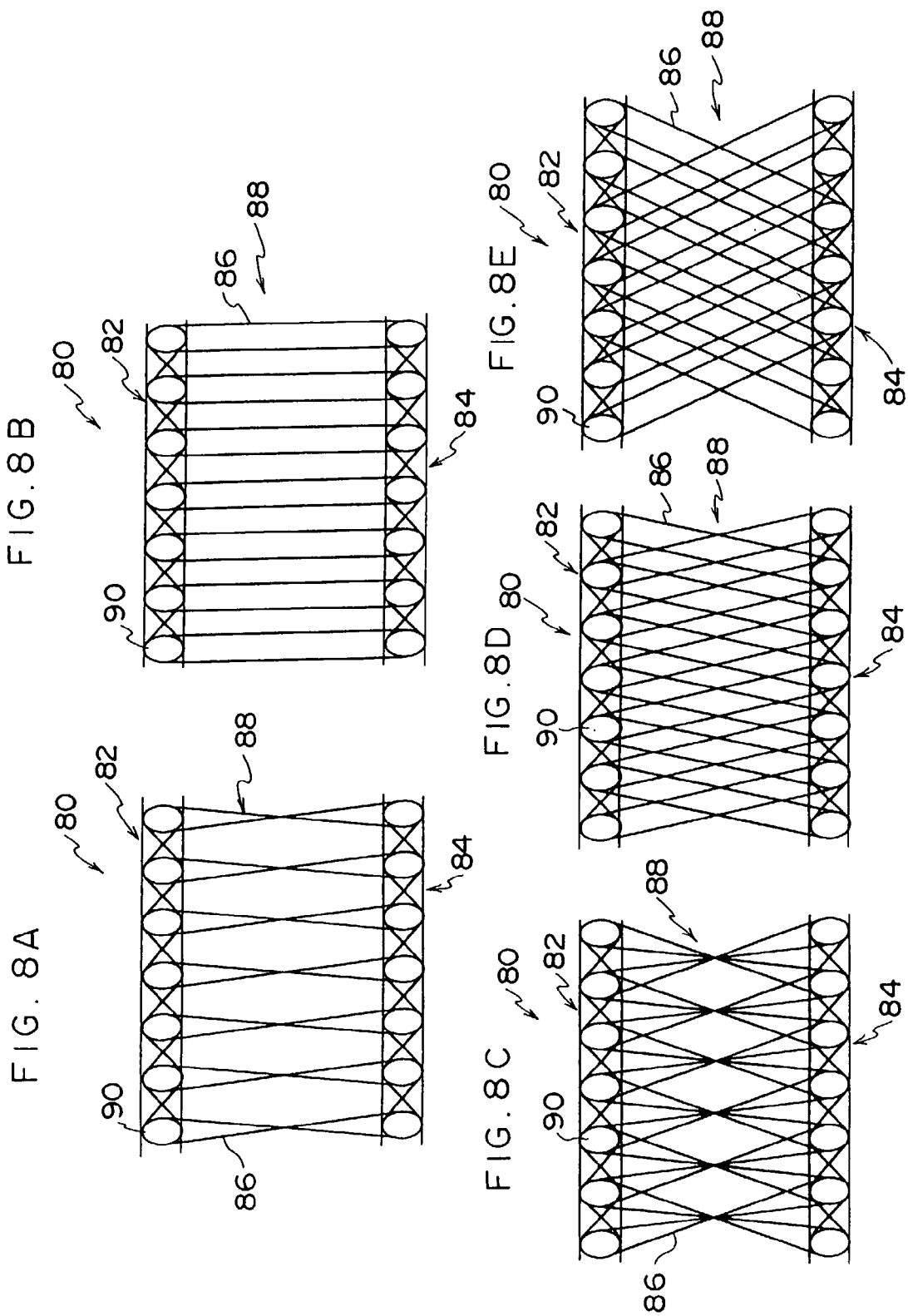

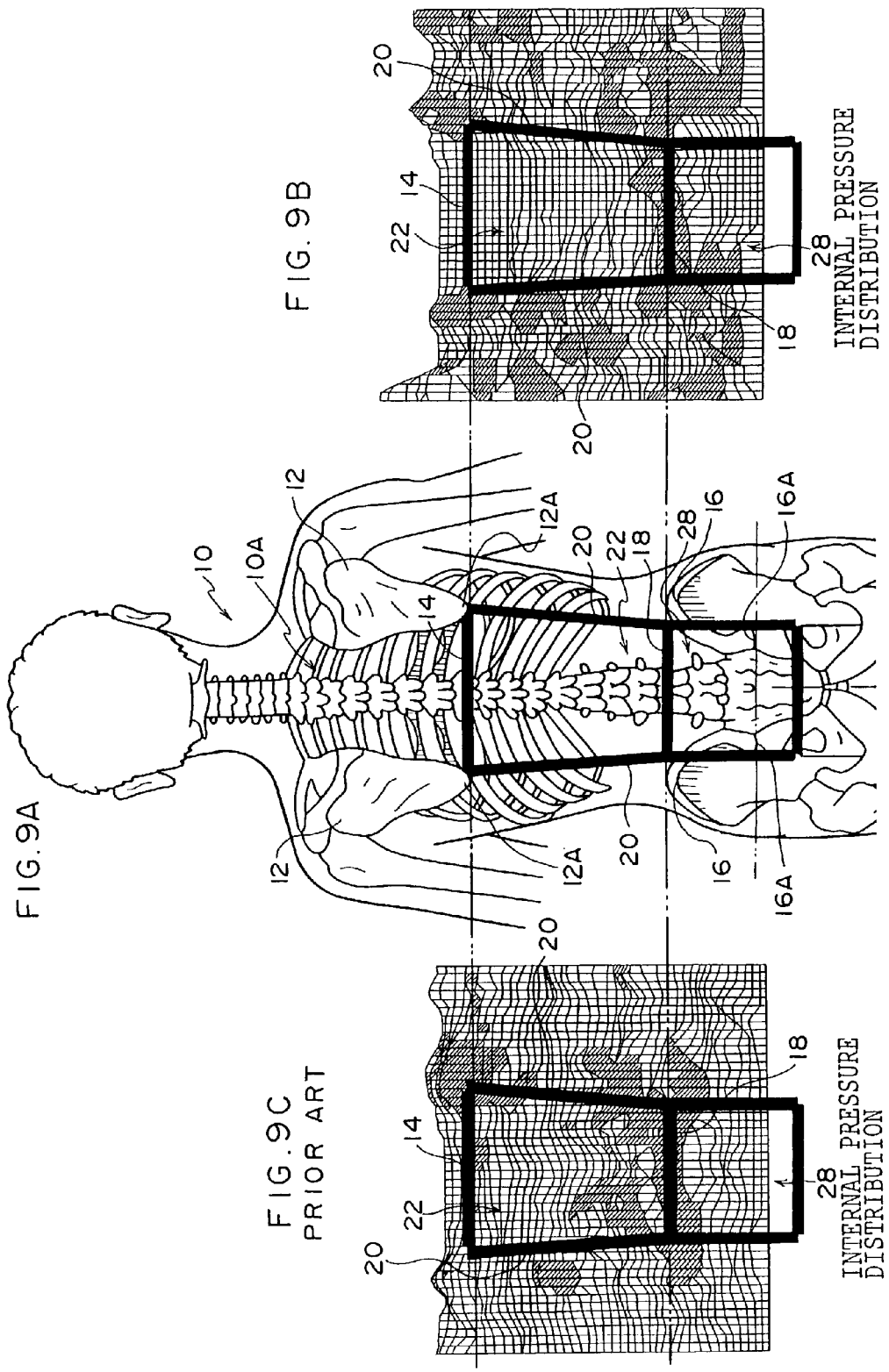

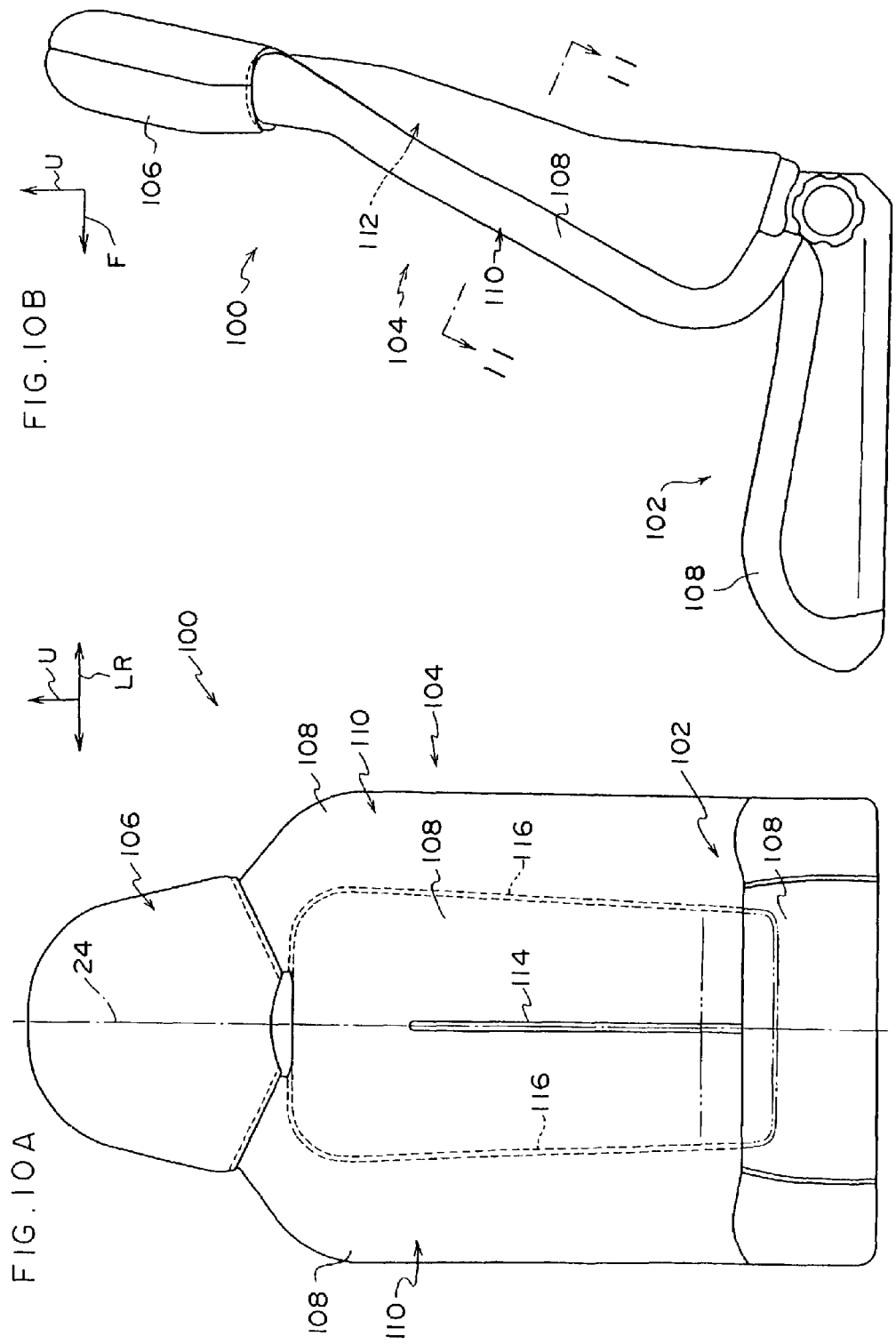

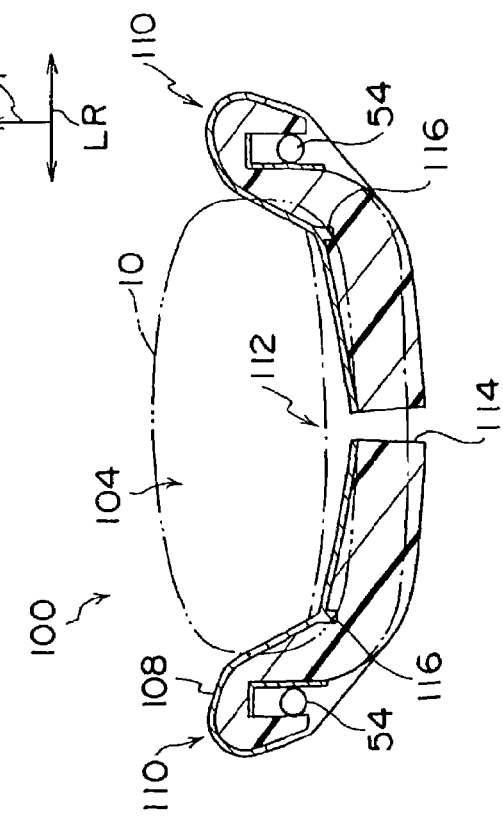
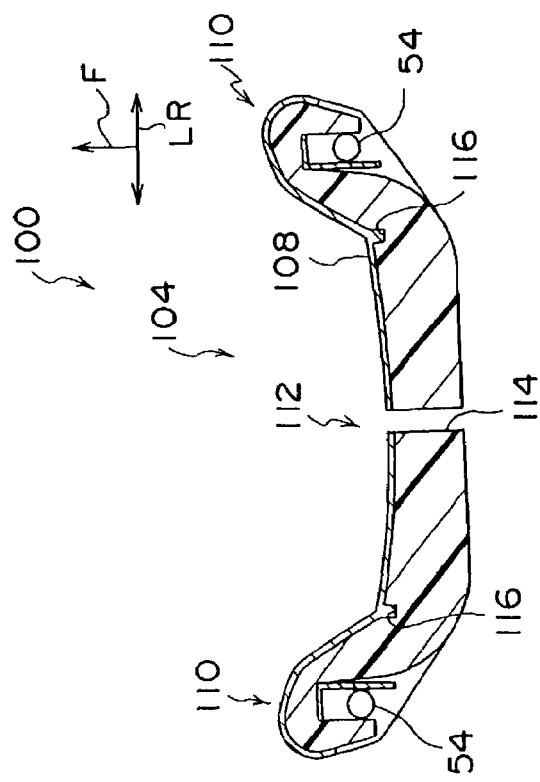

SEAT

BACKGROUND OF THE INVENTION

1. Field of the Invention

The present invention relates to a seat such as a vehicle seat for a seat occupant thereon.

2. Description of the Related Art

For example, a seat to be mounted on a vehicle is preferred to provide the so-called riding comfort by reducing shakes and quivers of a passenger during the running of the vehicle to reduce the load on the driving operation and by absorbing the vibrations during the running of the vehicle to reduce the physical load on the passenger. Not limiting to the vehicular seat, various seats are desired to reduce muscle fatigue even after prolonged periods of sitting additionally to improve the seating comfort.

Generally, a condition required for a comfortable seat is thought to include a mechanism having a lumbar support, a shoulder support, a head-rest or the like for holding to maintain a natural S-shape of a spinal column of the seat occupant.

As a mechanism for forming the S-shape of spinal column, a lumbar adjusting mechanism known as the Schukra backrest has been used. In such a mechanism, an air bag containing a changeable amount of air is for pressing the lumbar vertebrae and the shape of the lumbar portion supporting from the lumbar vertebrae to the central spinal area is adjustable by combining plate springs and links.

Here, the lumbar adjusting mechanism for the backrest is effective for holding the driving position and reduces the load on the seated comfort and the driving operation. Moreover, the lumbar support is enabled to mitigate the tension in the muscles by dispersing the supporting load of the lumbar. Further by changing a lumbar depth on the progress of time, the lumbar support is capable to mitigate the muscle stress.

However, the supporting load of the backrest distributes mainly along an area facing the spinal area, and the supporting load of the portion from the buttocks to the lumbar occupies about 30% of that of the entire backrest. Thus, the back and the lumbar portion are held on the backrest. The seating for a period longer than two hours disturbs the blood circulation to weaken the muscles and to generate a pain substance thereby to cause the lumbago.

In the seat of the prior art, moreover, the cushion and the backrest are separated enough to form a gap between the lower buttocks and the seat. This gap lowers the supporting power of the seat abutting the lumbar. When the upper body is rocked by the disturbances of the road surface while travelling, the supporting power of the seat become insufficient is compensated by the muscle strength of the lumbus.

Therefore, the seat may cause the muscle fatigue after long periods of sitting even achieving the seating comfort.

SUMMARY OF THE INVENTION

The present invention has been conceived in view of the background thus far described and has an object to provide a seat capable of reducing the muscular fatigue even after a long period of sitting.

In order to achieve the above-specified object, according to the present invention, there is provided a seat comprising: a seat cushion; and a seat back including a seat back frame mounted on the seat cushion and a backrest mounted on the seat back frame wherein, when a user is sitting on the seat, individual centers of a load at a plurality of regions, the regions presumed on left and right sides of a backrest surface symmetrically of a vertical central line of the seat back, are distributed outside a backrest area corresponding to a back region of the user, the back region defined by a straight line joining lower ends of left and right blade bones of the user, by a straight line joining upper ends of the left and right iliac bones, i.e., the iliac crests and by straight lines set above and along right and left lumbar iliocostal muscles.

According to this invention, when the backrest receives the load, the individual centers of the load at the regions presumed symmetrically transversely across the vertical central line of the seat back are distributed outside an area corresponding to the back region of the user. The back region is defined by the straight line joining the lower ends of the left and right blade bones, i.e., the angulus inferior scapulae, by the straight line joining the left and right iliac crests and by the straight lines set above and along the lumbar iliocostal muscles.

As shown in FIG. 1A, more specifically, a back region is defined by a line 14 joining angulus inferior scapulae 12A and 12A of a human body 10 sitting on a seat cushion, by a line 18 joining the left and right iliac crests and by lines 20 passing over the lumbar iliocostal muscles (although not shown). At this time, the lines 20 passing over the lumbar iliocostal muscles are generally located at a position joining the lower ends of blade bones 12 and the upper ends of the iliac bones 16.

For this back region 22, as illustrated in FIG. 1B, the centers at the time when the load is borne at a plurality of individual regions 26 divided from the backrest symmetrically across a vertical central line 24 and along in the vertical directions are distributed outside the backrest area corresponding to the back region 22. Here in FIG. 1B and FIG. 1C, the centers of the seat according to the present invention are indicated by solid circles, and those of the general seat of the prior art structure are indicated by solid squares.

As a result, the backrest supports the load to act from the user mainly at the portions of the body side portions and in the band area on the outer sides of the lumbar iliocostal muscles and can reduce the supporting pressure on the central side of the human body from the buttocks to the lumbar portion thereby to suppress the occurrence of the muscular fatigue (or the lumbago) due to the insufficient blood circulation at the lumbar portion.

In the present invention, it is preferred that the gravity centers of the load are also distributed on the outer area of a lower region extending below the backrest area, the lower region including a width substantially equal to that of the regions of the backrest.

According to this invention, when a lower region 28 extending with the width of the back region 22 is imagined on the lower side of the back region 22, as shown in FIG. 1A, the centers of the load to be received by the individual regions 26 overlying the lower region 28 fall outside of the lower region 28, as shown in FIG. 1B.

In the present invention, moreover, it is possible that the ratio of a load to act on the lower region extending downward from the lower side of the regions of the backrest and with substantially the same width as that of the regions, to the total load is not more than 25%.

According to this invention, as shown in FIG. 1A, the load to act on the lower region 28 extending below the back region 22 with the width of the back region is not more than 25% of the total load. In other words, the supporting load of the lumbar portion can be reduced to relax the muscles of the lumbar portion thereby to reduce the lumbago after a long period of sitting. Here, the total load is the supporting load for the entire backrest when the backrest is defined as the seat portion for supporting an upper body above a lower rear iliac spine 16B (as referred to FIG. 1A).

According to the present invention, therefore, there is provided a seat comprising: a seat cushion; and a seat back including a seat back frame mounted on the seat cushion and a backrest mounted on the seat back frame, wherein the individual centers of a load at a plurality of regions, which are imagined on the left and right sides of the backrest surface symmetrically of the vertical central line of the seat back, when a user is sitting on the seat, are distributed on the outer side of that region of the backrest corresponding to the back region of the human body, which is defined by a straight line joining the left and right angulus inferior scapulae 12A and 12A, by a straight line joining the crests of the left and right ischial bones and by straight lines set above and along the right and left lumbar iliocostal muscles.

At this time, moreover, the ratio of a load acting on the regions of the backrest corresponding to an area between a straight line set through the left and right upper rear iliac spine and a straight line set through the left and right lower rear iliac spines is preferably not less than 5% to the total load, more preferably 10% to the total load.

The present invention may be modified by a seat comprising: a seat cushion; and a seat back including a seat back frame mounted on the seat cushion and a substantially net-shaped backrest provided in a tensioned state on the seat back frame, wherein the backrest is provided in a tensioned state on the seat back frame such that the horizontal tension is minimized at the portion corresponding to the horizontal line set through the upper rear iliac spines and increased gradually from the portion of the minimized tension.

Moreover, the present invention may also be modified by a seat comprising: a seat cushion; and a seat back including a seat back frame mounted on the seat cushion and a net-shaped backrest provided in a tensioned state on the seat back frame, wherein the backrest is provided in a tensioned state such that the horizontal looseness is maximized at the portion corresponding to the horizontal line set through the upper rear iliac spines of the sitting position and decreased gradually from the portion of the maximized looseness.

According to this invention, the net-shaped backrest is usually provided in a tensioned state to take the maximum looseness or the minimum tension at the upper rear iliac spine height of the seated position. Since this arrangement, the portion of the human body from the buttocks to the lumbar portion may be held with sinking the body into the seat back.

As a result, a passenger on the vehicle, for example, can be reliably supported against the shakes and quivers during running of the vehicle, by reducing the load on the lumbar of the passenger due to the insufficient supporting force thereby and mitigating the muscular fatigue at the lumbar.

At this time, the net-shaped backrest may be formed of a three-dimensional stereo fabric by jointing a pair of ground fabrics spaced from each other, with joint yarns.

Moreover, the present invention may be exemplified by a seat comprising: a seat cushion; and a seat back including a seat back frame mounted on the seat cushion and a backrest mounted on the seat back frame, wherein a division of the regions of the backrest from the portion corresponding to a straight line joining the lower ends of the left and right blade bones of the user to a level of the seat cushion include a slit along the vertical centeral line of the seat back.

As a result, the back portion of the human body can be reliably sunk into and held by the backrest of the seat back so that the body can be reliably held against the shakes and quivers. Moreover, substantially sides of the human body is supported so that the disturbed blood circulation, as might otherwise be caused when the central portion from the back portion to the lumbar portion receives the pressure, can be eliminated to mitigate the muscular fatigue.

More preferably, the backrest is exemplified by a backrest made of urethane including a slit along the vertical central line of the seat back.

BRIEF DESCRIPTION OF THE DRAWINGS

FIG. 3A is a schematic front elevation showing the seat of the embodiment, and FIG. 3B is a side elevation of FIG. 3A;

FIG. 4A is a schematic front elevation of the seat under the state in which a cushion member is not provided in a tensioned state on the seat back;

FIG. 4B is a schematic diagram of a pattern for the cushion member to be provided in a tensioned state on the seat back;

FIGS. 8A to 8E are schematic sections individually showing essential portions of three-dimensional stereo fabrics of applied examples of pile portions;

FIG. 9A is a schematic diagram of the skeleton of a human body and similar to FIG. 1A;

FIG. 9B is a schematic diagram of the distribution of a load on the backrest of a seat according to the embodiment;

FIG. 9C is a schematic diagram of one example of the load distribution of a backrest of a seat of the prior art;

FIG. 10A is a schematic front elevation of a seat according to a second embodiment;

FIG. 10B is a schematic side elevation of the seat;

FIG. 11A is a schematic section showing an unseated state and taken along line 11-11 of FIG. 10B; and FIG. 11B is a schematic section showing a seated state and taken along line 11-11 of FIG. 10B.

DESCRIPTION OF THE PREFERRED EMBODIMENTS

One embodiment of the present invention will be described in detail with reference to the accompanying drawings. FIG. 2A, FIG. 3A and FIG. 3B show a seat 30 for vehicles according to a first embodiment of the present invention. Here in the following drawings: an arrow F designates a forward direction of the longitudinal direction of a vehicle; an arrow U designates an upward direction of the vertical direction; and arrows LR designate leftward and rightward directions.

Figure 2:
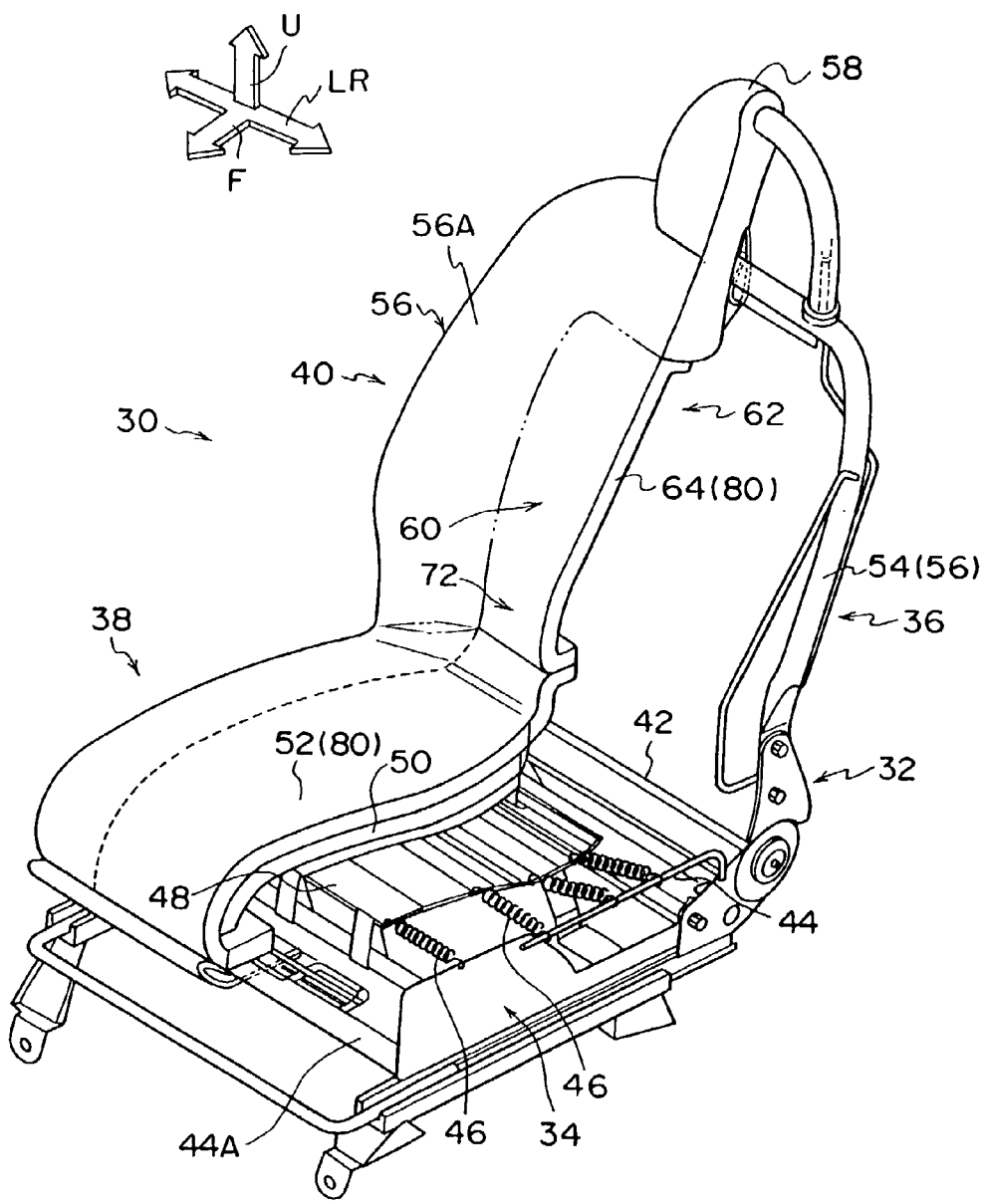
FIG. 2 is a partially broken schematic perspective view of a seat according to an embodiment of the present invention.

As shown in FIG. 2, the seat 30 is provided with a seat frame 32. This seat frame 32 includes a seat portion frame 34 and a back portion frame 36. A seat cushion 38 is formed by mounting a cushion material for the seat portion on the seat portion frame 34, and a seat back 40 is formed by mounting a cushion material for the back portion on the back portion frame 36.

In the seat frame 32, the back portion frame 36 is rotatably connected on a support pin 42 arranged in the transverse directions to the seat portion frame 34, thereby to construct a reclining mechanism turnable in the longitudinal direction. Here the detailed description of the reclining mechanism will be omitted.

The back portion frame 34 is provided with a pair of side frames 44. The seat cushion 38 is provided with coil springs 46 supported at their one-side ends on the side frames 44, and a material known as Plumaflex 48 supported elastically by the coil springs 46. The cushion material is formed of: an intermediate cushion member 50 made of an elastic member by laminating it on the upper face of the Plumaflex 48; and an upper cushion member 52 mounted tensely between the side frames 44 by laminating it on the upper face of the intermediate cushion member 50.

Here, the seat cushion 38 is extended forward and folded back only at its upper cushion member 52 and is supported by the side frames 44 and a front end frame 44A mounted between the side frames 44. As a result, the elastic compliance is increased to enhance the attenuating function and to control the blood-circulation disturbance such that the smoothness of the pedal operation is improved when the seat is used as a driver's seat. Here, the elastic compliance is calculated as a deflection divided by an average pressure value of a surface to contact.

The intermediate cushion member 50 and the upper cushion member 52 of the seat cushion 38 are each formed of a three-dimensional stereo fabric, as described hereinafter. The intermediate cushion member 50 suppresses the bottoming feel caused by employing only the upper cushion member 52 when the seat occupant is seated, thereby to mitigate a sense of discomfort due to the Plumaflex 48 or the coilsprings 46. Here, the intermediate cushion member 50 may be formed by folding back the upper cushion member 52. An arbitrary structure known in the art can be applied to the intermediate cushion member 50 and the upper cushion member 52, using a net-shaped elastic member or a planar elastic member.

The back portion frame 36 of the seat back 40 is provided with a pair of side frames 54. These side frames 54 are equipped with elastic members made of urethane or the like. Side supporting portions 56 corresponding to the seat occupant are mounted on the two left and right sides of the seat back 40. The side supporting portions 56 are formed of an elastic member of a predetermined shape. A head-rest portion 58 is mounted over between the side supporting portions 56. A seat backrest portion 60 is formed between the side supporting portions 56.

As shown in FIG. 2, FIG. 3A and FIG. 3B, more specifically, the seat 30 is a bucket type, in which the body of the seat occupant is fitted between the side supporting portions 56. A surface material 56A is adhered to the surfaces of the side supporting portions 56, for providing a proper cushioning property and a sense of comfortable contact. Here, the surface material 56A is exemplified by the later-described three-dimensional stereo fabric.

As shown in FIG. 2 and FIG. 4A, the seat back 40 is opened between the side supporting portions 56 to form an opening 62. In the opening 62 of the seat backrest portion 60, as shown in FIG. 2 and FIG. 3A, a cushion member 64 formed of the three-dimensional stereo fabric is provided in a tensioned state.

In other words, the seat backrest portion 60 is opened as the opening 62 at its central portion to face the back of the seat occupant of the seat 30. In this opening 62, the cushion member 64 is provided in a tensioned state.

With reference to FIG. 5 to FIG. 8, here is described the three-dimensional stereo fabric 80 used for the cushion members 52 and 64 in the seat 30 according to this embodiment.

Figure 5:
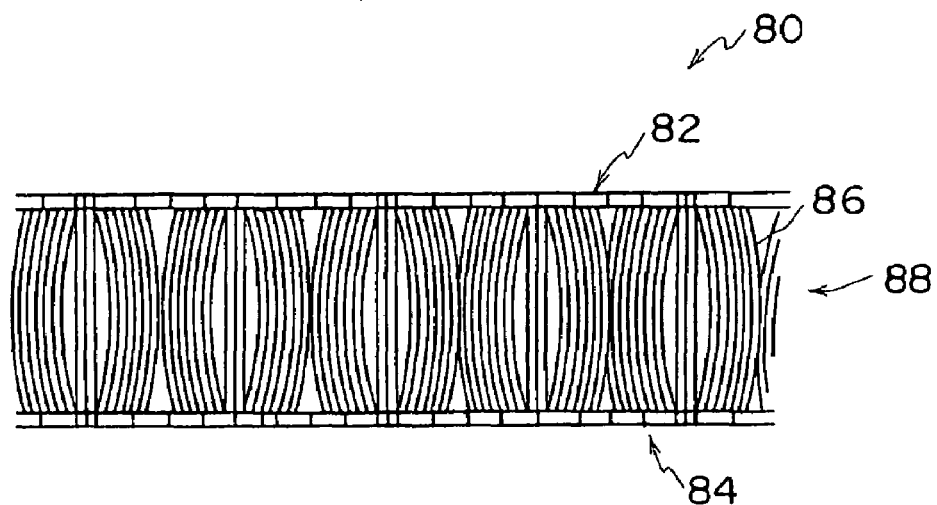
FIG. 5 is a schematic section showing a three-dimensional stereo fabric to be used as the cushion member.

As shown in FIG. 5, the three-dimensional stereo fabric 80 is constructed to include a pair of ground fabrics 82 and 84 and a pile portion 88. The ground fabrics 82 are arranged at a spacing from each other, and the pile portion 88 is formed of a number of joint yarns 86 reciprocating between the paired ground fabrics 82 and 84 to joint the two.

Figure 6:
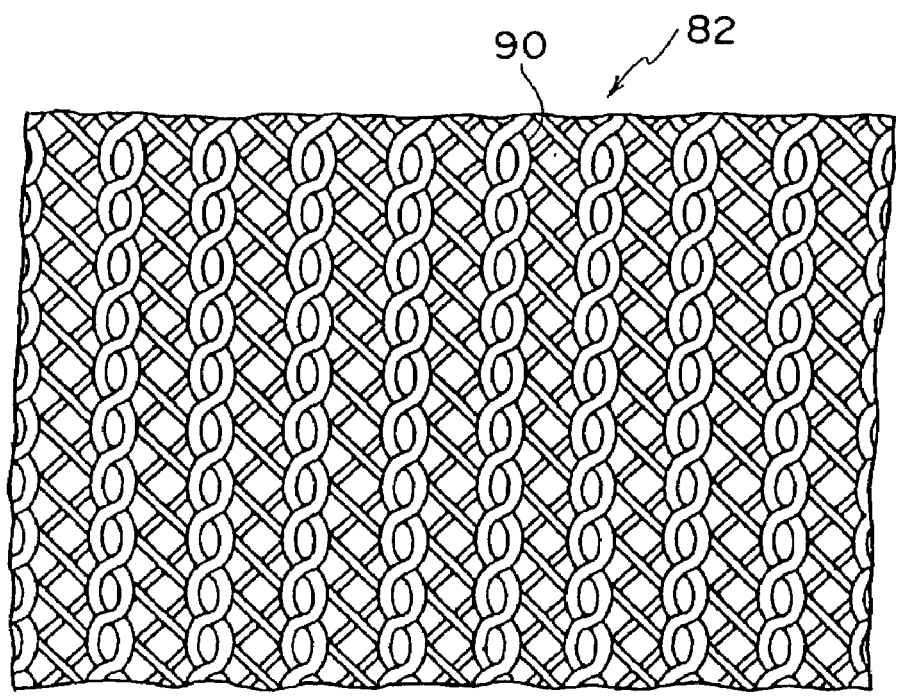
FIG. 6 is a schematic diagram showing one example of one grand fabric to be used in the three-dimensional stereo fabric.
Figure 7:
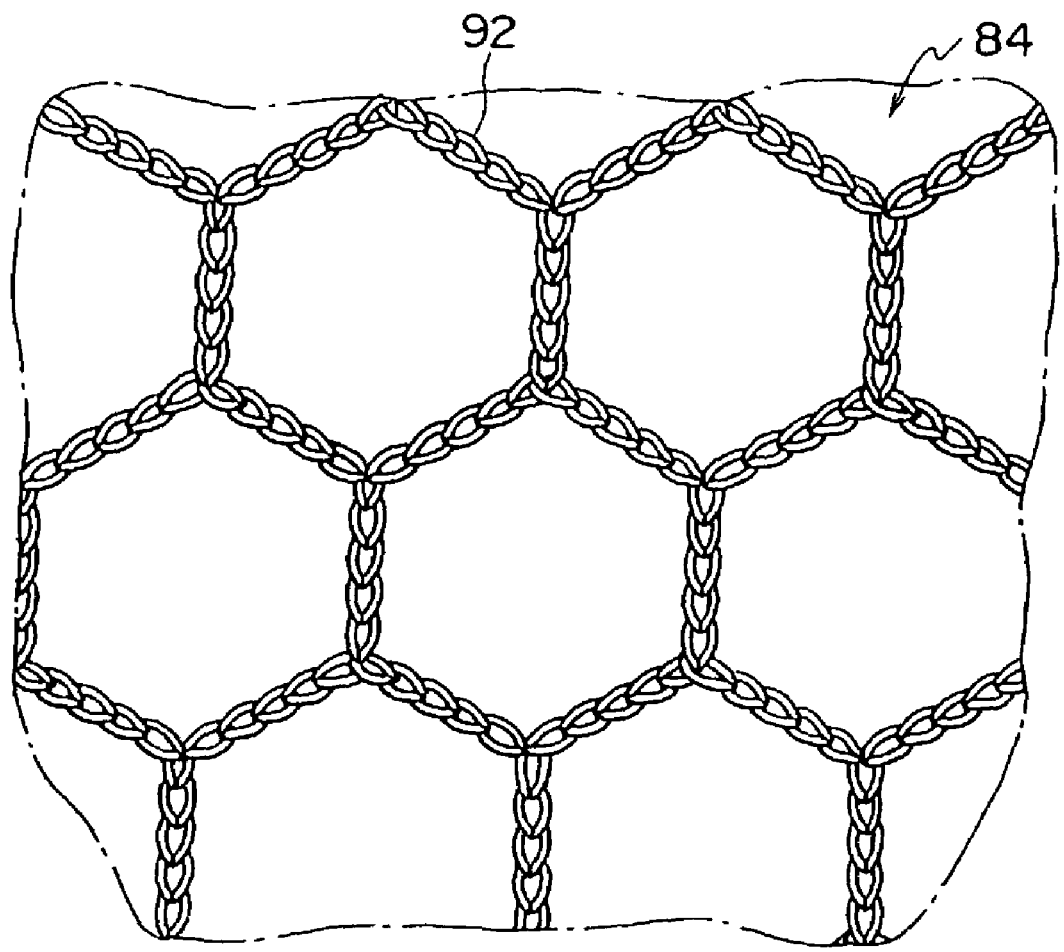
FIG. 7 is a schematic diagram showing one example of the other grand fabric to be used in the three-dimensional stereo fabric.

In one ground fabric 82 used, as shown in FIG. 6, the mesh is formed of yarns 90 twisted from short fibers, into a continuous flat fabric structure continuing in both the wale direction and the course direction. In the other ground fabric 84, as shown in FIG. 7, a honeycomb mesh is formed of yarns 92 twisted from short fibers. Therefore, the paired ground fabrics are composed of an upper mesh layer and a lower mesh layer. Further, the other ground fabric 84 is given a larger stitch than that of one ground fabric 82. Here, the ground fabrics 82 and 84 should not be limited to a thin structure or a honeycomb structure but may use another mesh fabric structure.

As shown in FIG. 5, the joint yarns 86 are so knitted between the ground fabrics 82 and 84 as to hold a predetermined spacing between one ground fabric 82 and the other ground fabric 84 to form the pile portion 88. As a result, a predetermined rigidity is given to the three-dimensional stereo fabric 80 of the mesh knit.

The three-dimensional stereo fabric 80 can be given a necessary stiffness by the thickness of the ground yarns, or yarns 90 and 92, forming the ground fabrics 82 and 84. The ground yarns 90 and 92 are usually selected within such a range as not to make the knitting work difficult. Moreover, the ground yarns 90 and 92 can be exemplified by mono-filament yarns but may be exemplified by multi-filament yarns or spun yarns considering the feeling or the softness of the surface touch.

The joint yarns 86 are preferably exemplified by mono-filament yarns having a thickness of not less than 167 decitexes and not more than 1,100 decitexes. Multi-filament yarns may not provide a sufficiently restorable cushion property. The thickness lower than 167 decitexes makes the stiffness of the three-dimensional stereo fabric 80 insufficient while the thickness higher than 1,100 decitexes makes the stiffness too large to provide a proper cushioning property.

Here, the restitutive force of the adjoining joint yarns for applying spring characteristics to the deformed joint yarns 86 is against the load of the seat occupant, additionally to the deformation of the net for forming the ground fabrics 82 and 84 and the deformation due to the fall or buckling of the joint yarns for forming the pile portion 88. Using the mono-filament yarns of a thickness not less than 167 decitexes and not more than 1,100 decitexes as the joint yarns 86 makes it possible to adapt those deformations and the restitutive force to the load supporting force, and to provide a soft structure whose soft spring characteristics will cause no stress concentration thereby.

Here, the three-dimensional stereo fabric 80 may include at least one uneven surface. Specifically, the ground fabrics 82 and 84 may be knitted to form an uneven surface. Such uneven surface is capable of providing spring elements of generally arched sections at bulging portions of the uneven surface in the ground fabrics 82 and 84. Moreover, soft spring characteristics can be given to the ground fabrics thereby to make it possible to form a structure with an elastic compliance equal to or higher than that of the muscle.

The material for the ground yarns 90 and 92 and the joint yarns 86 should not be limited to any special one but can be exemplified by synthetic fibers or regenerated fibers of polypropylene, polyester, polyamide, polyacrylonitrile or rayon, or natural fibers such as wool, silk or cotton. These fibers may be used either by themselves or in an arbitrary combination. The preferable fibers are exemplified by thermoplastic polyester fibers represented by polyethylene terephthalate (PET) or polybutylene terephthalate (PBT), polyamide fibers represented by nylon 6 or nylon 66, or a combination of two or more kinds of those fibers.

The ground yarns 90 and 92 and the joint yarns 86 should not be limited to the aforementioned shapes. Yarns with circular sections or deformed sections may also be employed for the ground yarns 90, 92 and the joint yarns 86.

The pile structure of the pile portion 88 presenting how to arrange the joint yarns 86 forming the pile portion 88 can be classified into types illustrated in FIG. 8A to FIG. 8E. The joint yarns 86 jointing the individual ground fabrics 82 and 84 are viewed from the side elevations.

FIG. 8A and FIG. 8B illustrate the straight types. The joint yarns 86 are knitted generally perpendicularly between the ground fabrics 82 and 84. Of these, the structure of FIG. 8A knits the joint yarns 86 straight in the shape of numerical character "8", and the structure of FIG. 8B knits them simply straight.

On the otherhand, FIG. 8C, FIG. 8D and FIG. 8E illustrate the cross types. The joint yarns 86 are knitted to cross each other midway between the ground fabrics 82 and 84. Of these, the structure of FIG. 8C knits the joint yarns 86 crossly in the shape of numerical character "8", and the structure of FIG. 8D knits the joint yarns 86 simply crossly. Moreover, the structure in FIG. 8E gathers and knits the two joint yarns 86 double-crossly.

Here, the structures, in which the joint yarns 86 are obliquely arranged to cross each other, as in FIG. 8C to FIG. 8E, are advantageous over the structures in FIG. 8A and FIG. 8B, in which the joint yarns 86 are arranged generally perpendicularly between the ground fabrics 82 and 84. This is because the former structures can give soft spring characteristics of higher compressibility while retaining a sufficient restitutive force with the buckling strength of the individual joint yarns 86.

The cushion members 52 and 64 thus using the three-dimensional stereo fabric 80 are lowered in their spring properties to have higher damping ratios so that they are easily deformed to follow and fit the form of the passenger better. Here the cushion member 64 of the seat back 40 and the upper cushion member 52 of the seat cushion 38 are mounted and integrated via a mounted portion 70. This arrangement enables to support a portion from the buttocks to the lumbar to be subjected to the heavy load of the seat occupant as if with a device like a hammock in a direction to float that portion. As a result, the seat is enabled to easily follow the change in the position of the seat occupant and to improve the seating comfort. The cushion member 64 of the seat back 40 and the upper cushion member 52 of the seat cushion 38 may be stitched at the mounted portion 70.

Here, the three-dimensional stereo fabric 80 to be provided in a tensioned state as the cushion member 64 on the seat backrest portion 60 of the seat back 40 is cut by using a pattern 68. The pattern 68 is formed into a predetermined shape in accordance with a pattern 66 conforming to the opening 62, as shown in FIG. 4B.

The pattern 68 is formed to have the largest width at a predetermined height $h_1$ from the mounted portion 70 between the end portion on the side of the seat cushion 38 and the upper cushion member 52, in a predetermined height $h_2$ from the mounted portion 70. When the cushion member 64 is provided in a tensioned state on the seat back 40, therefore, the seat backrest portion 60 is most loosened at the portion of the height $h_1$ from the seat cushion 38.

In other words, the cushion member 64 cut from the three-dimensional stereo fabric 80 by using the pattern 68 is most loosened at the level of the height $h_1$ from the mounted portion 70 when the cushion member 64 is provided in a tensioned state on the seat backrest portion 60. Moreover, the looseness gradually lessens from that position toward the levels of the mounted portion 70.

The pattern 68 at the portion of the height $h_1$ has a width $W_o$ enlarged by a predetermined widening factor α from the width $W_s$ of the corresponding portion of the pattern 66. That is, $W_o = W_s \times (1+\alpha)$. Here, this embodiment is exemplified by setting the widening factor α (to α=0.04) so that the width $W_o$ may be larger by 4% than the width $W_s$.

In the seat backrest portion 60, therefore, the cushion member 64 is so provided in a tensioned state as is most loosened at the position of the height $h_1$ in the portion of the height $h_2$ from the mounted portion 70.

These heights $h_1$ and $h_2$ are set on the basis of the form of the person to be sitting on the seat 30. Specifically, the height $h_1$ is set on the basis of the upper rear iliac spine height of the seated position corresponding to the vicinity of the upper end portion of the iliac bone of the person sitting on the seat 30, and the height $h_2$ is set on the basis of the angulus inferior scapula height or the position corresponding to the lower end portion of the clavicle.

Figure 1:
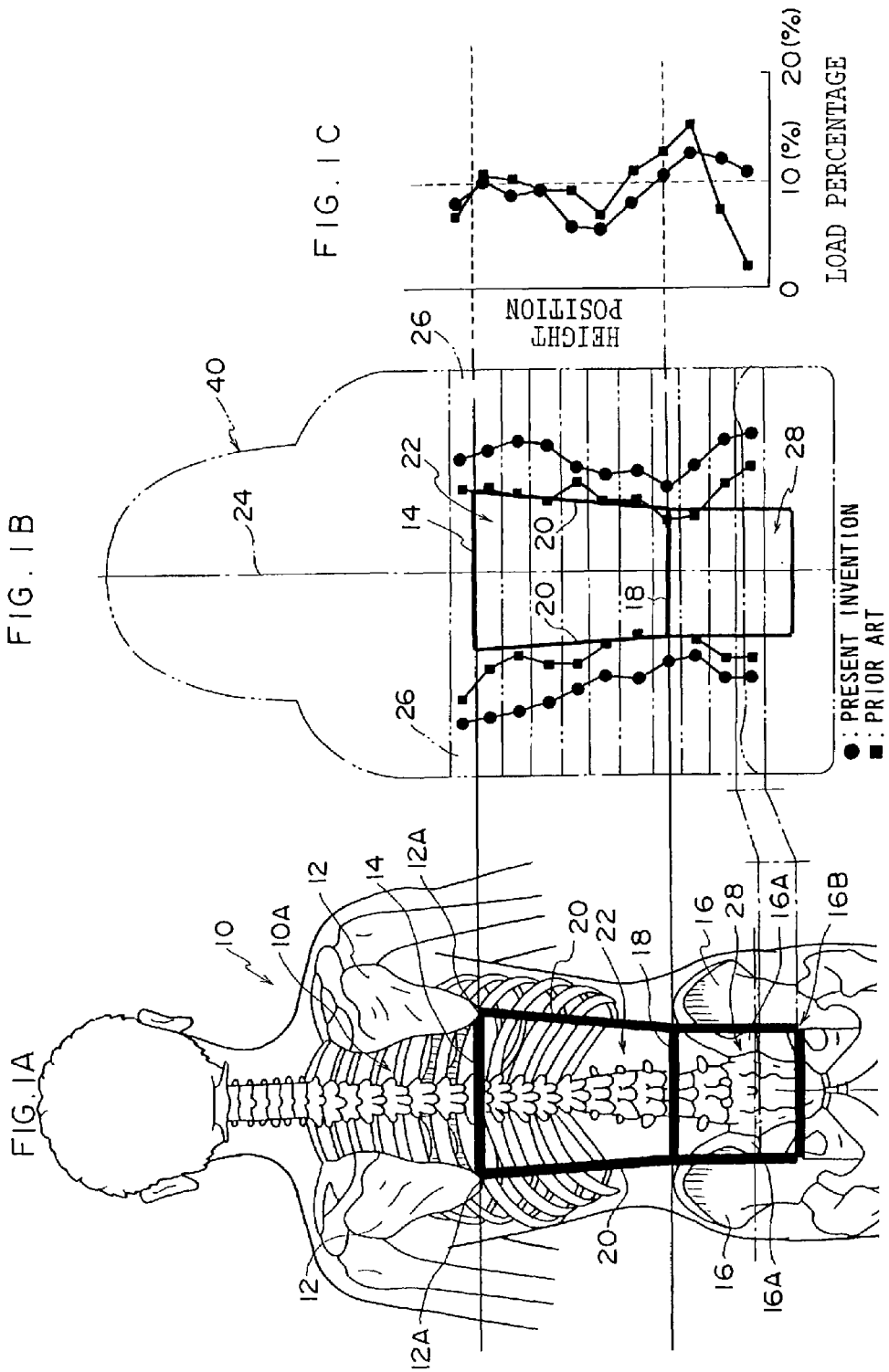
FIG. 1A is a schematic diagram of the skeleton of a human body.
FIG. 1B is a schematic diagram of a distribution of a center of a load on a seat back according to the present invention.
FIG. 1C is a schematic diagram of a loading percentage distribution of the seat back according to the present invention.

The seated position upper rear iliac spine height is measured from the seating face to a point where the upper rear iliac spine 16A of an iliac bone 16 most protrudes backward, as shown in FIG. 1A. In a Japanese statistics, the upper rear iliac spine height has average values of 154.3 mm for a male young adult group, 149.1 mm for a female young adult group and 151.8 mm for the whole of young adult. The average values are 152.2 mm, 136.1 mm and 144.3 mm for a male middle-aged adult group, a female middle-aged adult group and the whole of middle-aged adult, respectively. Based on these Japanese statistics, a range of average values from 136.1 mm to 154.3 mm is therefore contemplated. These values exemplify the height $h_1$ by 150.0 mm in this embodiment.

The angulus inferior scapula height of the seated position is measured from the seating face to an angulus inferior scapulae 12A or the lower end of a blade bone 12. According to the Japanese statistics, average values of the angulus inferior scapula height are 456.9 mm, 416.1 mm and 437.2 mm for the male young adult group, the female young adult group and, the whole of young adult, respectively. In the same statistics, the average values are 427.2 mm, 377.2 mm and 401.1 mm for the male middle-aged adult group, the female middle-aged adult group and the whole of middle-aged adult, respectively. Based on these Japanese statistics, a range of average values from 377.2 mm to 456.9 mm is therefore contemplated. Considering those values set the height $h_2$ to 450.0 mm in this embodiment as an example.

In the seat 30, moreover, the width of the opening 62 is so set that the body side portions of the seat occupant may be held on the side supporting portions 56. Therefore, the width $w_a$ in the height $h_2$ on the pattern 68, as shown in FIG. 4B, is set on the basis of the angulus inferior scapula width. This angulus inferior scapula width is the straight distance between the angulus inferior scapulae 12A of the blade bones 12 as shown in FIG. 1A. In the Japanese statistics, the average values of the angulus inferior scapula width are 194.7 mm, 163.8 mm and 179.8 mm for the male young adult group, the female young adult group and the whole of young adult, respectively. The average values are 187.6 mm, 161.2 mm and 174.3 mm for the male middle-aged adult group, the female middle-aged adult group and the whole of middle-aged adult, respectively. Based on these Japanese statistics, a range of average values from 161.2 mm to 194.7 mm is therefore contemplated. Therefore, the width $w_a$ is set so sufficiently larger than the angulus inferior scapula width that the upper body of the seated person is confined in the seat backrest portion 60 of the seat 30. Also, the body side portions confined in the seat backrest portion 60 abut against the side supporting portions 56 forming the peripheral edge portions of the opening 62.

An arbitrary joint method can be used when the three-dimensional stereo fabric 80 is to be provided in a tensioned state as the cushion member 64. When joining, the three-dimensional stereo fabric 80 is usually jointed to the surface material 56A of the side supporting portions 56 as if they are integrated. When the surface material 56A is made of a cloth such as felt, it is usual to stitch the surface material 56A to the cushion member 64. As a result, the three-dimensional stereo fabric 80 becomes expandable in the longitudinal directions while the transverse expansion is suppressed. Therefore, the deformation conforming to the human body shape is facilitated to improve the hold ability and stability at the seated time far better.

Accordingly, by tensing the cushion member 64 formed by cutting the three-dimensional stereo fabric 80, a flexible portion 72 is formed at the seat backrest portion 60 of the seat back 40 around the position of the height $h_1$ from the seating face.

When tensioning the cushion member 64, the three-dimensional stereo fabric 80 is provided in a tensioned state as the cushion member 64 on the seat backrest portion 60 so that the spring property can be lowered to raise the damping ratio thereby to support the upper body in the hammock shape.

The human body sitting on the seat 30 is confined at the upper body between the side supporting portions 56 so that the back faces the cushion member 64 tensed on the seat backrest portion 60. At the same time, the body area from the buttocks to the lumbar faces the flexible portion 72 of the seat backrest portion 60.

At this flexible portion 72, the width $W_o$ of the cushion member 64 is made larger than the width $W_s$ of the opening 62 so that the portion from the buttocks to the lumbar is so confined, when the occupant is deeply seated, in the seat backrest portion 60 as to be enveloped by the cushion member 64. In short, the area from the buttocks to the lumbar sinks in a confined and held manner into the cushion member 64.

Moreover, the upper body is held at the side portions abutting against the side supporting portions 56. At this time, the central portion of the upper body abuts against the cushion member 64 tensed to close the opening 62. The cushion member 64 is either very little loosened or tensed close to the maximum at its portion above the height $h_2$. In the region below the portion, a slight deflection can be generated. By this deflection, the upper body is so held at its portion below the height $h_2$ as is enveloped by the cushion member 64. In other words, the seat 30 stoops the upper body in a slightly more bent position than the S-shaped spinal position that has been accepted as the proper seated position in the prior art.

FIG. 9B presents the measured results of the distribution of the body pressure to be applied to the seat back 40 when the occupant is sitting on the seat 30. On the other hand, FIG. 9C presents one example of the body pressure distribution on the back of the seat of the prior art.

Here, the transverse section of the back of a human body 10 bulges backward from a spine 10A to the body sides. These bulges are large especially at the blade bones 12 and at the bone portions of the iliac spines 16A.

On the other hand, the large backward bulges from the blade bones 12 to the iliac bones 16 are located at the (not-shown) ridge lines of lumbar iliocostal muscles. When a person having this back shape is sitting on the seat, the bone portions of the blade bones 12 and the upper rear iliac spines 16A and the muscle portions of the lumbar iliocostal muscles contact under a high internal pressure. A cause of the muscular fatigue after the seated position of a long time is disturbance of blood circulation due to the load acting on the muscles, i.e., pressure on the blood vessels around the muscles from rising internal pressure.

For reducing the muscular fatigue, therefore, it is necessary to consider the load to be borne by the major thoracic longissimus muscles and the lumbar iliocostal muscles on the left and right sides along the spine. Therefore, the load on the muscles is evaluated, and the regions as the seat-design requisites are set in the following manners.

As shown in FIG. 1A and FIG. 9A, more specifically, a back region 22 is defined as the region which is defined by a line 14 joining the angulus inferior scapulae 12A or the lower ends of the left and right blade bones 12 of the human body 10, a line 18 joining the left and right iliac crests, and lines 20 joining the angulus inferior scapulae 12A and the iliac crests. In the seat 30, the cushion member 64 provided in a tensioned state to the seat backrest portion 60 faces the back region 22. At this time, the lines 20 joining the angulus inferior scapulae 12A and the iliac crests extend along the vertical lumbar iliocostal muscles on the left and right side of the spine 10A of the human body.

In the seat backrest portion 60 of the present invention, on the other hand, the position of the cushion member 64 at the height $h_2$ from the mounted portion 70 is located on the line 14 at the upper end of the back region 22.

The upper rear iliac spines 16A are located at the center of a region 28 extended with the width of the back region 22. The flexible portion 72, where the deflection takes the maximum at the position of the height $h_1$ from the mounted portion 70 of the cushion member 64, as shown in FIG. 4B, is located at the positions of the upper rear iliac spines 16A at the seated position.

Therefore, it is found that the internal pressure distribution of the back region 22 of the seat back 40 in the seat of the present invention in FIG. 9B gives a lower internal pressure than that of the seat which has been thought optimum in the prior art in FIG. 9C. It is also found that the internal pressure is higher on the outer sides of the lines 20 of the back region 22. It is further found that the internal pressures are low near the line 18 at the lower end of the back region 22, i.e., the line joining the left and right iliac crests and in the region 28 extended from the back region 22. Additionally, the internal pressures are high on the left and right outer sides of the region 28.

These differences in the internal pressure distribution result from that the cushion member 64 of the backrest is provided in a tensioned state according to the shape and size of the human body. Specifically, looseness at the height $h_1$ of the upper rear iliac spines 16A where the buttocks largely extend is adjusted to be maximized at the flexible portion 72, and gradually lessened toward the portion of the height $h_2$ of the angulus inferior scapulae 12A and 12A. Therefore, the cushion member 64 formed by cutting the three-dimensional stereo fabric 80 in conformity with the body shape is deformed so that the internal pressure rises at the portions from the ridge lines in transverse section of the back, i.e., lumbar iliocostal muscles to the body sides.

Moreover, the portion of the back region 22 from the lower end line 18 to below the tuber ischiadicum is enveloped and housed at its portion from the buttocks to the lumbar vertebrae in the cushion member 64 by the flexible portion 72 at the height of the upper rear iliac spines 16A. Therefore, the internal pressure from the buttocks to the lumbar vertebrae rises at the portions from the ridge lines in the transverse section of the human body, i.e., from the left and right lines of the region 28 to the body side contacting with the net or the cushion member 64.

In FIG. 1B, on one hand, when there are imagined regions 26 divided from the backrest 40 of the seat 30 symmetrically of the transverse directions across a central line 24, the positions of the center or the centers of the loads on the individual regions 26 are created on the basis of the pressure distribution of FIG. 9B. On the other hand, FIG. 1C plots the load percentages of the vertically divided regions against the supporting load of the backrest, as created on the basis of the pressure distribution of FIG. 9B. This graph of the load percentages indicates the load percentages at the positions of the individual regions against the total load to be received by the seat back 40. Here in FIG. 1B and FIG. 1C, the centers of the seat 30 and the load percentages are indicated by solid circles, and those of the prior art based on FIG. 9C are indicated by solid squares.

As seen from FIG. 1B, the center of the load is located within the back region 22 and within the region 28 in the prior art. In the seat 30, the center of the load is located far outside of the back region 22 and the region 28. In other words, the pressure to be received at the center around the back in the prior art can be received on the body sides.

Moreover, the supporting load distribution of the conventional seat from the buttocks to the lumbar portion is characterized in that the load percentage rises near the fifth lumbar vertebrae just below the line 18 of the iliac crests and abruptly drops there below. These characteristics are caused because the cushion and the backrest are separated to leave a gap between the buttocks and the backrest.

In the seat of the present invention, on the contrary, the deformation occurs in the cushion member 64 which has been formed by cutting the three-dimensional stereo fabric 80 in conformity with the body shape. Therefore, the load percentage in the region between the straight line passing through the left and right upper rear iliac spines 16A and the straight line passing through left and right lower rear iliac spines 16B (as referred to FIG. 1A and FIG. 9A) is 10% or larger. Thus, the supporting load is not abruptly changed but homogeneously distributed. Moreover, the center is located on the body sides of the region 28. While the load percentage of the region 28 of the seat of the prior art exceeds 35%, that of the seat of the present invention is about 15%, calculating on the basis of FIG. 9C.

In the seat 30, therefore, the supporting pressure on the lumbar portion of the human body 10 can be generally reduced to suppress the occurrence of an insufficient blood circulation, as might otherwise be caused by the high supporting pressure. In other words, the blood circulation is not disturbed by the supporting pressure.

When the seat 30 is mounted on a vehicle, for example, the support of the upper body against the quiver and shake due to the vibrations of running vehicle does not become insufficient. This is because the upper body is supported by the band areas of the seat 30 corresponding to the body sides from the shoulders to the buttocks. It is possible to avoid unnecessary stress on the lumbar to compensate for the insufficient support of the seat of the prior art.

Therefore, the lumbar muscles can be held in a relaxed state thereby to prevent the occurrence of lumbago after a long period of sitting.

Next, a second embodiment of the present invention is described. This second embodiment has a fundamental construction identical to that of the foregoing first embodiments. The common parts between the first and second embodiments will not be described while the parts are designated as having the same reference numerals.

FIG. 10A and FIG. 10B show a seat 100 according to the second embodiment. Here, this seat 100 is provided with a seat cushion 102, a seat back 104 and a head-rest portion 106.

In this seat 100, the seat cushion 102, the seat back 104 and the head-rest portion 106 are individually made of urethane and mounted on the seat frame 32 (although not shown). A predetermined surface material 108 is adhered to the individual surfaces of the seat cushion 102, the seat back 104 and the head-rest portion 106 as a general construction to provide a proper sense of elasticity and contact when they are seated.

This seat 100 is a so-called bucket type, in which side supporting portions 110 are formed on both the left and right sides of the seat back 104. A seat backrest portion 112 is formed between the side supporting portions 110.

In the seat 100, as shown in FIG. 10A, a slit 114 is formed in the seat backrest portion 112. This slit 114 is formed along the central line 24 and reaches the back side of the seat backrest portion 112, as shown in FIG. 11A and FIG. 11B. Here, only the seat back 104 is shown in, but the seat cushion 102 and so on are omitted from FIG. 11A and FIG. 11B.

As shown in FIG. 10A, the slit 114 reaches the joint portion to the seat cushion 102, at its lower end. Moreover, the upper end of the slit 114 is located to correspond to the lower end positions of the blade bones of the human body 10.

In other words, the upper end of the slit 114 is set on the basis of the angulus inferior scapula height of the seated position. As shown in FIG. 1A and FIG. 9A, the angulus inferior scapula height of the seated position is the height of the angulus inferior scapulae 12A or the lower end of the blade bones 12 from the seating face. The angulus inferior scapula height is set on the basis of the build of the person to be sitting on the seat 100.

In the seat back 104, grooves 116 are formed between the side supporting portions 110 and the seat backrest portion 112, as shown in FIG. 10A, FIG. 11A and FIG. 11B. As shown in FIG. 10A, the grooves 116 merge into each other in an upper portion of the seat back 104 and form a fragile portion around the seat backrest portion 112. This is because the side of the central portion or the slit 114 of the seat backrest portion 112 is easily caused by the elastic force of the urethane to rock in the longitudinal directions, especially backward of the side supporting portions 110.

In the seat 100 thus constructed, the upper part of the seated body leans on the seat back 104. The seat backrest portion 112 receives the load of the upper body.

At this time, the slit 114 is formed in the seat backrest portion 112. In the seat backrest portion 112, therefore, the slit 114 expands, and due to the pressure of the grooves 116, the portions on the sides of the slit 114 are moved backward by the load and curved to bulge backward (FIG. 11B). In other words, the seat 100 is deformed to envelope the upper body because the slit 114 is formed in the seat backrest portion 112 made of the urethane. Here in FIG. 11B, the seat backrest portion 112 before deformed is indicated by single-dotted lines.

As a result, the surface of the seat backrest portion 112 contacts closely with the upper body (of the human body 10 of FIG. 11B). This upper body is reliably housed in the seat backrest portion 112 so that the body sides are reliably held on the sides of the side supporting portions 110. At this time, the upper end of the slit 114 is located near the angulus inferior scapulae so that the upper side (or the head side) of the blade bones will not sink into the seat backrest portion 112.

The seat backrest portion 112 is divided along the slit 114 by the load of the upper body so that the seat 100 holds the upper body reliably. At this time, the seat backrest portion 112 on the sides of the side supporting portions 110 contacts closely with the body. Therefore, the upper body is reliably supported on its sides by the side supporting portions 110 so that the supporting force in the normal directions will not become insufficient against shakes and quivers in the transverse directions.

It is, therefore, possible to reliably prevent the lumbar portion from being burdened with the load, as might otherwise be caused because of the shortage of the supporting force in the normal directions against the transverse shakes. Even after a long period of sitting, therefore, it is possible to prevent the lumbago or muscular fatigue, as might otherwise be caused by the load on the lumbar portion.

Moreover, the seat 100 is retracted to house the upper body by the load for the seat backrest portion 112 to receive from the upper body so that the load by the upper body is received on the sides of the side supporting portions 110. In other words, the human body 10 is supported by the seat backrest portion 112 (or the side supporting portions 110) at the portions from the lumbar iliocostal muscles to the body sides.

Therefore, the lumbar portion and the central sides of the back portion of the human body 10 do not receive the pressure from the seat backrest portion 112. On the lumbar portion and the central sides of the back portion, therefore, the blood circulation is not disturbed by the pressure received from the seat backrest portion 112. It is, therefore, possible to reliably reduce the fatigue, as might otherwise be caused by the disturbed blood circulation in those regions.

The seat thus having the vertical slit 114 formed along the central line in the seat backrest portion 112 envelops and holds the upper body with the seat backrest portion 112 being moved backward by the load of the upper body. Therefore, the seat causes no muscular fatigue or the like even after a long period of sitting.

In this embodiment, the seat 100 is formed of the urethane. However, the material for the seat 100 should not be limited thereto but could be exemplified by an arbitrary material having a proper elastic force.

Moreover, the embodiments thus far described merely present examples of the present invention but should not limit the construction of the present invention. For example, the embodiments have been described on the seats 30 and 100 mounted on the vehicle such as an automobile. However, the present invention can be applied not only to the seat for the automobile but to any seat such as a seat for airplanes or chairs, so long as the seat is what a person is sitting. Especially, the present invention is advantageous for use as a seat to rest thereon for a long time or a seat to be subjected to vibrations or shakes.

According to the present invention, as has been described hereinbefore, the seat supports the human body in the band shape on the regions facing the body sides so that it can reduce the supporting pressure for the portion from the buttocks to the lumbar portion. Therefore, there is obtained an excellent effect that the lumbar portion is freed from the fatigue feel such as the muscular fatigue, as might otherwise be caused by the insufficient blood circulation at the lumbar portion, even after a long period of sitting.

What is claimed is:
1. A seat comprising:
a seat cushion; and
a seat back including a seat back frame mounted on the seat cushion a backrest mounted on the seat back frame, and a flexible portion formed on the backrest,
wherein the backrest is substantially net-shaped, and the backrest is provided in a tensioned state on the seat back frame, such that a horizontal tension in the backrest is minimized at a portion corresponding to a horizontal line set through upper rear iliac spines of a seated position of the user and increased gradually from a portion of the minimized tension, or such that a horizontal looseness is maximized at the portion corresponding to a horizontal line set through the upper rear iliac spines of the seated position and decreased gradually from a portion of the maximized looseness,
wherein when a user is sitting on the seat, individual centers of a load situated at a plurality of regions, the regions presumed on left and right sides of a backrest surface symmetrically about a vertical central line of the seat back, are distributed outside a backrest area corresponding to a back region of the user, the backrest area defined by a straight line joining lower ends of left and right blade bones of the user, by a straight line joining upper ends of left and right iliac bones and by straight lines set above and along right and left lumbar iliocostal muscles.

2. The seat of claim 1, wherein centers of the load are distributed on an outer area of a lower region extending below the backrest area, the lower region including a width substantially equal to a width of the regions of the backrest.

3. The seat of claim 2, wherein a ratio of a load acting on the lower region to a total load is about 15%.

4. The seat of claim 2, further comprising:
first and second points on the seat back, respectively, located equidistant from a vertical central straight line on the seat back extending from a junction of the seat cushion with the seat back at a height about 377.2-456.9 mm, as measured from the junction of the seat cushion with the seat back, said first and second points located on right and left sides of said vertical central line, respectively, and wherein a total distance between said first and second points is about 161.2-194.7 mm,
third and fourth points on the seat back, respectively, located equidistant from said vertical central line, at a height of about 136.1-154.3 mm, as measured from the junction of the seat cushion with the seat back, said third and fourth points located on said right and left sides of said vertical central line, respectively, and wherein a total distance between said third and fourth points is about 161.2-194.7 mm,
fifth and sixth points at the junction of the seat cushion with the seat back, located equidistant from said vertical central line, said fifth and sixth points located on said right and left sides of said vertical central line, respectively, and wherein a total distance between said fifth and sixth points is about 161.2-194.7 mm,
wherein said backrest area and said lower region are defined as an area bounded by a line connecting said first and second points, a line connecting said second and sixth points, a line connecting said sixth and fifth points, and a line connecting said fourth and first points.

5. The seat of claim 1, wherein a ratio of a load acting on a lower region extending below the backrest area and including a width substantially equal to a width of the regions of the backrest is not more than 25% to a total load.

6. The seat of claim 5, wherein the total load is a supporting load of the backrest when the backrest is defined as a seat portion for supporting an upper body of the user above lower rear iliac spines of the user.

7. The seat of claim 5, further comprising:
first and second points on the seat back, respectively, located equidistant from a vertical central straight line on the seat back extending from a junction of the seat cushion with the seat back at a height about 377.2-456.9 mm, as measured from the junction of the seat cushion with the seat back, said first and second points located on right and left sides of said vertical central line, respectively, and wherein a total distance between said first and second points is about 161.2-194.7 mm,
third and fourth points on the seat back, respectively, located equidistant from said vertical central line, at a height of about 136.1-154.3 mm, as measured from the junction of the seat cushion with the seat back, said third and fourth points located on said right and left sides of said vertical central line, respectively, and wherein a total distance between said third and fourth points is about 161.2-194.7 mm,
fifth and sixth points at the junction of the seat cushion with the seat back, located equidistant from said vertical central line, said fifth and sixth points located on said right and left sides of said vertical central line, respectively, and wherein a total distance between said fifth and sixth points is about 161.2-194.7 mm,
wherein said backrest area and said lower region are defined as an area bounded by a line connecting said first and second points, a line connecting said second and sixth points, a line connecting said sixth and fifth points, and a line connecting said fourth and first points.

8. The seat of claim 1, wherein a ratio of a load on the regions of the backrest corresponding to an area between a straight line set through left and right upper rear iliac spines of the user and a straight line set through left and right lower rear iliac spines is not less than 5% to a total load.

9. The seat of claim 8, wherein a ratio of a load of the regions of the backrest corresponding to an area between a straight line set through the left and right upper rear iliac spines of the user and a straight line set through the left and right lower rear iliac spines is not less than 10% to a total load.

10. The seat of claim 1, wherein the substantially net-shaped backrest is formed of a three-dimensional stereo fabric by jointing a pair of ground fabrics spaced from each other, with joint yarns.

11. The seat of claim 10, wherein the three-dimensional stereo fabric includes at least one uneven surface to provide spring elements of generally arched sections at bulging portions of the uneven surface.

12. The seat of claim 1, wherein said horizontal line set through upper rear iliac spines is defined as a line at a height of about 136.1-154.3 mm, as measured from the junction of the seat cushion with the seat back.

13. A seat comprising:
a seat cushion; and
a seat back including a seat back frame mounted on the seat cushion a substantially net-shaped backrest provided in a tensioned state on the seat back frame, and a flexible portion formed on the backrest,
wherein the backrest is provided in a tensioned state on the seat back frame such that a horizontal tension in the backrest is minimized at a portion corresponding to a horizontal line set through upper rear iliac spines of a seated position of a user and increased gradually from a portion of the minimized tension, or such that a horizontal looseness of the backrest is maximized at the portion corresponding to the horizontal line set through the upper rear iliac spines of the seated position of the user and decreased gradually from a portion of the maximized looseness, in order to support another portion of the seat facing an area from the said user's buttocks to said user's lumbar to be subjected to the heavy load of a seat occupant with a device, said device arranged to integrate said backrest and said seat cushion, said device further arranged in a substantially concave manner relative to the seat occupant, such that said device functions in a direction to float said another portion.

14. The seat of claim 13, wherein the net-shaped backrest includes a three-dimensional stereo fabric by jointing a pair of ground fabrics spaced from each other, with joint yarns.

15. The seat of claim 13, wherein said horizontal line set through upper rear iliac spines is defined as a line at a height of about 136.1-154.3 mm, as measured from the junction of the seat cushion with the seat back.

16. A method for making a seat for a specific user, said method composing:
measuring the specific user to determine the dimensions of a backrest area, said backrest area defined by a straight line joining lower ends of left and right blade bones of the user, by a straight line joining upper ends of left and right iliac bones of the user, and by straight lines set above and along right and left lumbar iliocostal muscles of the user,
providing a seat having a seat cushion, a seat back including a seat back frame mounted on the seat cushion, a backrest mounted on the seat back frame, and a flexible portion formed on the backrest,
wherein the backrest is substantially net-shaped, and the backrest is provided in a tensioned state on the seat back frame, such that a horizontal tension in the backrest is minimized at a portion corresponding to a horizontal line set through upper rear iliac spines of a seated position of the user and increased gradually from a portion of the minimized tension, or such that a horizontal looseness is maximized at the portion corresponding to a horizontal line set through the upper rear iliac spines of the seated position and decreased gradually from a portion of the maximized looseness,
and wherein said seat cushion, seatback, and backrest are configured such that when the user is sitting on the seat, individual centers of a load situated at a plurality of regions, the regions presumed on left and right sides of a backrest surface symmetrically about a vertical central line of the seat back, are distributed outside the backrest area.

17. A seat made by the process of claim 16.

18. The seat of claim 17, wherein the substantially net-shaped backrest is formed of a three-dimensional stereo fabric by jointing a pair of ground fabrics spaced from each other, with joint yarns.

19. The seat of claim 18, wherein the three-dimensional stereo fabric includes at least one uneven surface to provide spring elements of generally arched sections at bulging portions of the uneven surface.

20. The seat of claim 17, wherein centers of the load are distributed on an outer area of a lower region extending below the backrest area, the lower region including a width substantially equal to a width of the regions of the backrest.

21. The seat of claim 20, wherein a ratio of a load acting on the lower region to a total load is about 15%.

22. The seat of claim 17, wherein a ratio of a load acting on a lower region extending below the backrest area and including a width substantially equal to a width of the regions of the backrest is not more than 25% to a total load.

23. The seat of claim 22, wherein the total load is a supporting load of the backrest when the backrest is defined as a seat portion for supporting an upper body of the user above lower rear iliac spines of the user.

24. The seat of claim 17, wherein a ratio of a load on the regions of the backrest corresponding to an area between a straight line set through left and right upper rear iliac spines of the user and a straight line set through left and right lower rear iliac spines is not less than 5% to a total load.

25. The seat of claim 24, wherein a ratio of a load of the regions of the backrest corresponding to an area between a straight line set through the left and right upper rear iliac spines of the user and a straight line set through the left and right lower rear iliac spines is not less than 10% to a total load.

* * * * *